United States Patent [19]
Mager

[11] 3,899,041
[45] Aug. 12, 1975

[54] ELECTRIC VEHICLE

[76] Inventor: Charles J. Mager, Box 353 A, R.D. 4, Quakertown, Pa. 18951

[22] Filed: Oct. 23, 1970

[21] Appl. No.: 83,448

[52] U.S. Cl.................. 180/65 R; 105/50; 318/139; 318/382
[51] Int. Cl........ B60l 11/18; B60l 7/12; B60l 15/08
[58] Field of Search .............. 180/65, 60, 6.5, 6.28, 180/34; 105/35, 49, 50, 51, 61; 318/139, 382; 321/48

[56] References Cited
UNITED STATES PATENTS

| 676,965 | 6/1901 | Sachs................................. 318/139 |
| 723,727 | 3/1903 | Pfeil..................................... 318/139 |
| 778,133 | 12/1904 | Keates........................ 180/65 R UX |
| 1,562,903 | 11/1925 | Miller.............................. 180/65 R |
| 3,222,582 | 12/1965 | Heyman et al...................... 318/139 |
| 3,373,316 | 3/1968 | Palmer.......................... 180/65 R X |
| 3,444,946 | 5/1969 | Waterbury........................ 180/65 R |
| 3,454,122 | 7/1969 | Grady, Jr. .......................... 180/65 R |
| 3,477,536 | 11/1969 | Carini................................ 180/65 F |
| 3,530,356 | 9/1970 | Aronson ........................ 318/139 X |

FOREIGN PATENTS OR APPLICATIONS 514,351    1939    United Kingdom................... 320/61

Primary Examiner—David Schonberg
Assistant Examiner—Milton L. Smith
Attorney, Agent, or Firm—Clarence A. O'Brien; Harvey B. Jacobson

[57] ABSTRACT

An electric vehicle having batteries for supplying power to DC series motors mounted to the wheels of the vehicle. A solid state Jones Chopper is employed for controlling the motors. During operation of the vehicle, when the driver's foot is lifted from the accelerator pedal, the circuit produces dynamic braking of the motors which slows down the vehicle.

7 Claims, 4 Drawing Figures

Charles J. Mager
INVENTOR.

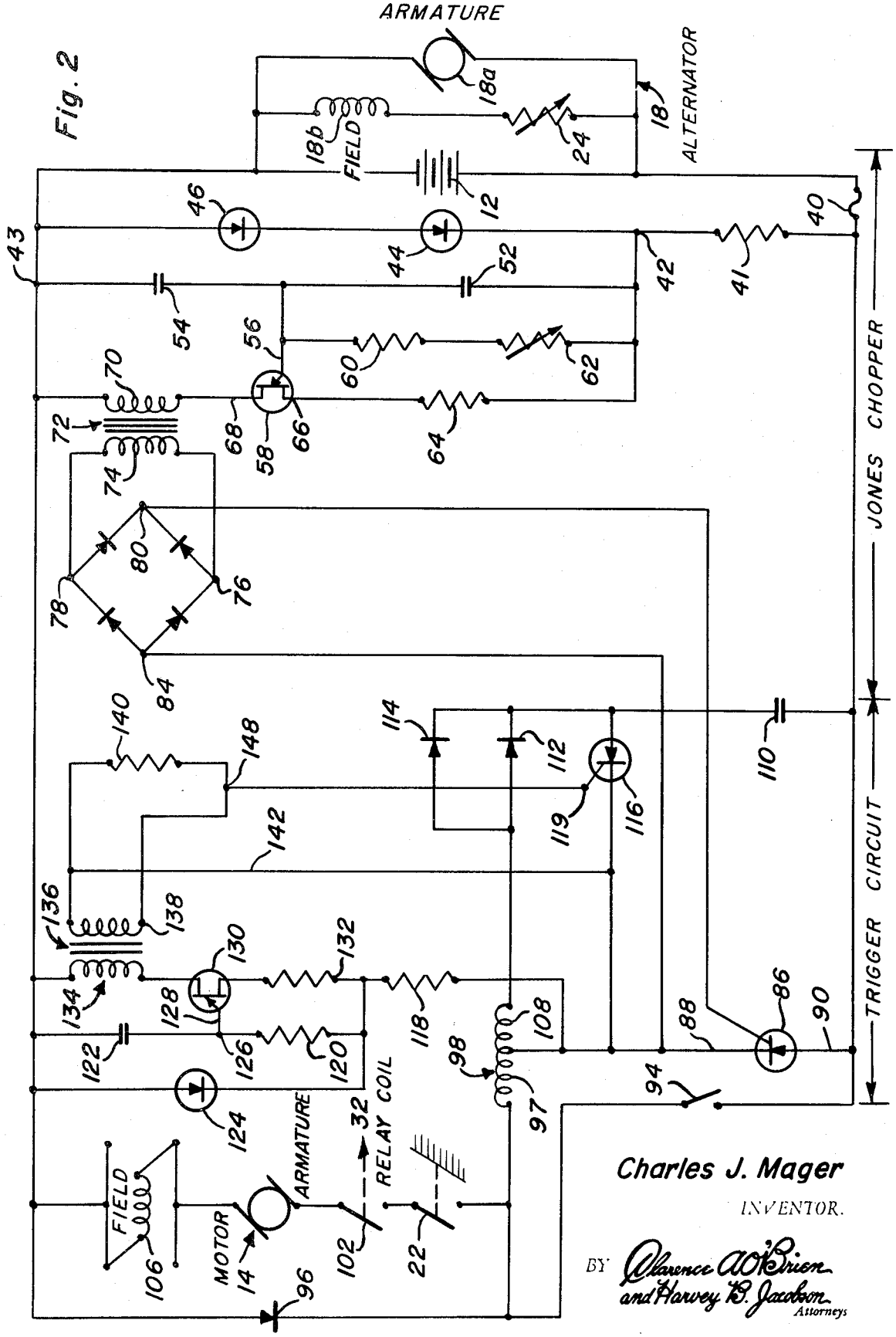

ELECTRIC VEHICLE

BACKGROUND OF THE INVENTION

The present invention relates to electric vehicles, or more particularly to an electronic solid state controller for governing the speed of vehicle operation.

During the present time, society has given great impetus to the search for pollution free vehicles. Although scientists and engineers believe that the conventional internal combustion engine can be improved so as to reduce high pollution exhausts, many authorities believe that a superior solution lies in the development of electric vehicles.

Earlier electric vehicles have utilized battery driven DC series motors. In the past, there have been two methods available for controlling the voltage to, and hence the speed of a battery driven DC series motor of any appreciable power. The first method was the employment of a rheostat which is inserted in series with the motor. Although utilization of such a device produces smooth action by the vehicle, the rheostat, being a resistive device, causes loss of electrical power. The second method is to have the battery of the field winding switched in series or parallel. Although this method produces little power loss, as the switching is effected, vehicle jerking results.

SUMMARY OF THE INVENTION

During recent years, circuitry has been perfected for governing the operation of a DC motor to be employed in a battery driven electric vehicle. By utilizing this basic circuit, known as the Jones Chopper, the present invention results in an electric vehicle that exhibits smooth operation and extremely high electrical efficiency. Of course, the complexity of a vehicle of the intended type is far less than that of internal combustion engines due to elimination of the entire mechanical power train. Thus, it is no longer necessary to rely upon energy transmission from an engine through intermediary members including a clutch, transmission, and drive shaft.

Alternators are mounted to each wheel of the vehicle. During normal operation of the vehicle, the alternator fields are not energized so that the alternators do not place a load on the wheels. However, when the driver lifts his foot from the accelerator and steps on a brake pedal, the alternator field is energized. Inasmuch as the operating alternators produce dynamic braking of the motors, a drag on the vehicle wheels occurs. It is presently contemplated that a brake pedal be provided which will actuate a hydraulic brake system in addition to the dynamic braking. Further, while the alternators operate, they charge the batteries of the vehicle.

The performance contemplated by the present invention will be superior, in many respects, to the conventional internal combustion engine. Electric vehicles have been known in the past to exhibit extremely smooth acceleration and deceleration. Further, starting is instantaneous. Thus, there is no need for an initial warm up of the vehicle prior to taking it on the road. Once on the road, the user has the advantage of four wheel drive which is particularly advantageous in snow and on rough terrain.

Perhaps one of the most important aspects of the present invention resides in the fact that electrical vehicles do not produce exhaust pollution as do conventional internal combustion engines. Accordingly, the present vehicle is a solution to Federal and State requirements for automobile manufacturers to produce pollution-free vehicles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an electrical schematic diagram of the electrical circuitry associated with the present vehicle;

DESCRIPTION OF THE INVENTION

Figure 1:
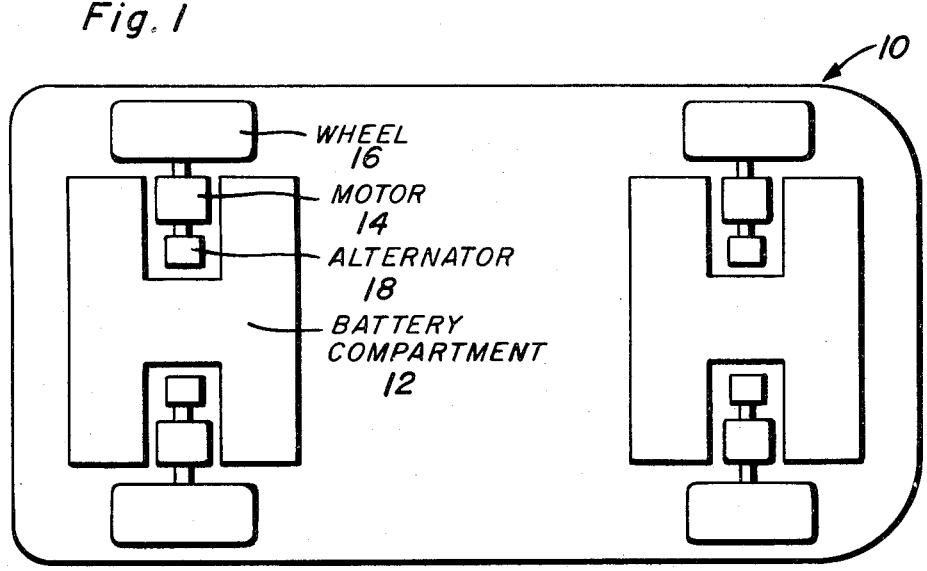
FIG. 1 is a schematic view illustrating the disposition of vehicle components relative to a vehicle frame.

The basic components for the present invention are illustrated in FIG. 1 wherein an electrical vehicle is generally indicated by reference numeral 10. A battery compartment 12 is located in the forward central, and rearward central portions of the vehicle. These battery compartments supply energization to four motors 14 respectively mounted to the four wheels 16 of the vehicle. Alternators 18 are connected to the four wheels 16 in such a manner that the alternator fields remain deenergized during normal driving of the vehicle. Thus, during normal driving the alternators remain freewheeling. However, as will be explained hereinafter, when an accelerator pedal (not shown) is released, and a brake pedal depressed, the field of the alternator is energized so that the alternator becomes operative. As a result of alternator operation, dynamic braking of the motors occurs since the alternators become drags on the wheels. The alternators are connected in a conventional manner to their respective battery compartments so that they charge the vehicle batteries when the accelerator pedal is released, simultaneous with dynamic braking.

Figure 3:
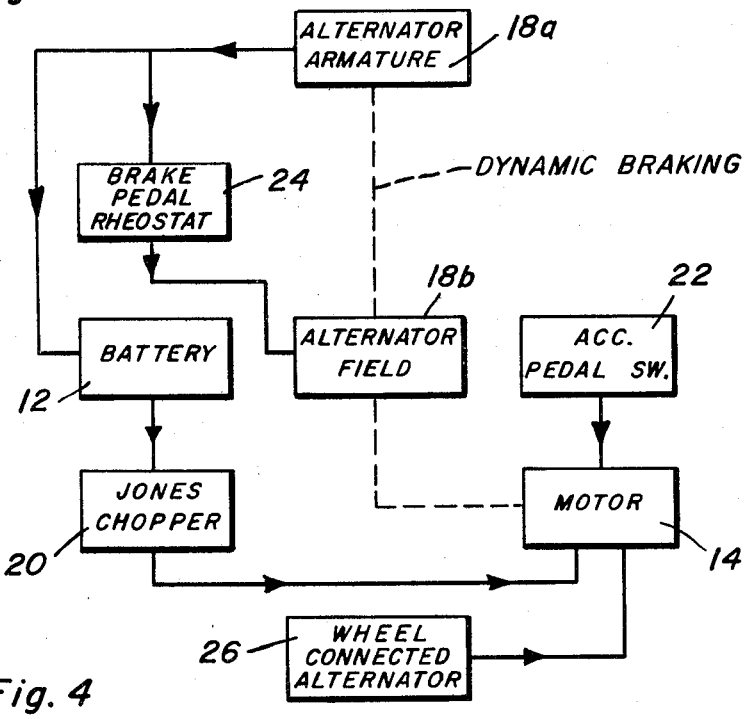
FIG. 3 is an electrical block diagram illustrating the electrical control system of FIG. 2 in block form.

Referring to FIG. 3, the electrical control circuit for the present invention is illustrated in block form. Although only one motor and one alternator are illustrated, four are used on the vehicle. In the present invention the method for controlling the voltage to, and hence the speed of each battery driven DC series motor 14 involves the use of a rapid-acting solid state switching circuit, called a chopper, which is connected to the motors. More particularly, in the preferred embodiment of the present invention, the chopper employed is known as the Jones SCR chopper (class D) 20. A further discussion of this chopper is included in chapter 11.2.3 of the General Electric SCR Manual (Fourth Edition). However, a circuit analysis of this chopper as utilized in the present invention is discussed hereinafter. An accelerator pedal switch connects the motor 14 in and out of the circuit. A brake pedal rheostat 24 is serially connected with the field 18b of the alternator, adjustment of the brake pedal rheostat varying the amount of field current which in turn varies the amount of drag that the alternator will exert upon a corresponding wheel. As illustrated, the accelerator pedal switch 22 and the brake pedal rheostat 24 are separate and independent. Thus, when the accelerator pedal switch 22 is released, the motor 14 remains deenergized and becomes free-wheeling. This is analogous to a coasting condition. However, once the brake pedal rheostat 24 is depressed, dynamic braking occurs which slow down the vehicle. It is to be understood that a brake pedal actuator, (not shown), connected to the rheostat, can also be coupled to a hydraulic braking system which would come into play after a preselected amount of dynamic braking has occurred. Of course, once the alternator becomes operative, it begins to charge an associated battery compartment 12. The armature 18a of the alternator 18 is always connected to an associated wheel 16. However, as prevously explained, the alternator does not become operative until the brake pedal rheostat 24 allows field current to flow in the alternator.

Figure 4:
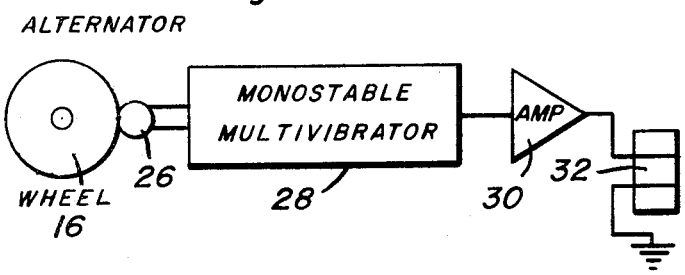
FIG. 4 is a block diagram illustrating certain electrical components that form a part of the electrical control circuitry of FIG. 2.

In FIG. 4 a block diagram is illustrated and indicates an alternator 26, separate and apart from the alternators 18 previously discussed. The alternator 26 responds to rotation of a wheel 16. When the alternator 26 senses a constant speed of vehicle operation, it produces an AC voltage with a frequency that is directly proportional to the speed of the wheel. The AC voltage is fed to a monostable multivibrator 28 which inverts the AC voltage generated by alternator 26 into a train of DC pulses. The pulses are fed to an amplifier 30 which then drives a relay coil 32, the relay opening and closing a relay switch that is serially connected to the motor 14. The switch to be discussed hereinafter opens and closes at the same frequency as the DC pulse train, which in turn matches the frequency of the AC signal generated by alternator 26. Thus, the circuitry associated with FIG. 4 serves to maintain the motor 14 as a constant rotational velocity when desired.

FIG. 2 illustrates the electrical schematic diagram for the circuitry employed in the present electric vehicle. As indicated in the Figure, alternator 18 is connected across an associated vehicle's battery supply 12. As previously mentioned, armature 18a is connected to an associated wheel of the vehicle and always rotates with that wheel. However, a variable resistor in the form of brake pedal rheostat 24 is serially connected to the field winding 18b of the alternator. When the vehicle is being positively driven, the variable resistor assumes a high value that prevents the conduction of current through the field 18b. Thus, although the armature 18a rotates with an associated wheel, the alternator 18 is not operative during positive driving of the vehicle.

The positive terminal of battery 12 is connected to a first terminal of a trigger circuit through fuse 40. The negative terminal of the battery 12 is connected to a second end of the terminal of the trigger circuit. The function of the trigger circuit is to actuate a Jones Chopper.

Considering the trigger circuit, a voltage dropping resistor 41 is connected to series Zener diodes 44 and 46. The purpose of the Zener diodes is to regulate the voltage appearing across the terminals 42, 43 of a unijunction trigger circuit. Directly connected capacitors 52 and 54 are connected in parallel with the Zener diodes 44 and 46. Capacitor 54 serves as a charging capacitor for the emitter 56 of unijunction transistor (UJT) 58. Serially connected resistors 60 and 62 (variable) are connected between the junction point 42 and the emitter terminal 56. The variable resistor 62 establishes the frequency of the pulse train generated by the unijunction transistor 58 during periodic charging of capacitor 54. The variable resistor 62 is mechanically linked to the accelerator pedal (not shown) of the vehicle. Thus, the variable resistor 62 and therefore the output of the unijunction transistor 58 is responsive to the depression of the accelerator pedal. The output of the unijunction transistor 58 is connected, as hereinafter explained, to a Jones Chopper which will be triggered by the pulses produced by the unijunction transistor 58. A resistor 64 biases base two 66 of UJT 58. The frequency of this triggering action will determine the speed that the motor 14 rotates. The unijunction trigger circuit is conventionally used for DC choppers and inverters. See pages 332–333 of the General Electric Transistor Manual, Seventh Edition. Briefly, in operation of the triggering circuit, charge from battery 12 builds up on capacitor 54. When a preselected threshold is reached, as governed by the variable resistor 62, UJT 58 is turned on thereby allowing current to flow from capacitor 54 through the emitter-base one (68) and then through the primary 70 of a transistor 72. This discharge through the UJT causes transformation of a pulse through the transformer 72 across the secondary winding 74. The terminals of the secondary winding 74 are connected to the terminals 76 and 78 of a diode bridge which serves to attenuate transients in the circuit. Terminals 80 and 84 are respectively connected to the gate 82 and cathode 88 of a silicon control rectifier (SCR) 86. Each pulse which is coupled to the secondary 74 triggers the SCR 86 into conduction.

The SCR 86 serves as a rapid-acting switch that effects chopper action. The anode 90 of the SCR is connected to the positive terminal of the battery 12. The Jones Chopper has a practical duty cycle ranging from about 20% to about 80%. With the chopper operating at low speed, about 20% of the supply voltage is applied to the motor 14. Although a single motor 14 is illustrated in FIG. 2, it will be appreciated that the other three motors are connected in parallel with the one illustrated. However, in certain applications, it may be desirable to furnish each motor with its own control circuit. The voltage applied to the motor may be increased to 80% of the battery voltage as more torque is required. When 80% of the battery voltage is applied to the motor, relay switch 94 is closed applying full voltage to motor 14 and producing maximum torque at the vehicle wheels. The connection between the SCR 86 and motor 14 includes the circuit branch having accelerator pedal switch 22, switch 102 associated with the previously described relay coil 32, the latter opening and closing when constant vehicle speed is maintained. The switches 22 and 102 are serially connected to the armature 104 and field 106 of DC series motor 14. A diode 96 is connected across the circuit branch (22, 102, 14). This diode is known as a free-wheeling diode. Its purpose is to carry the inductive current when SCR 86 is turned off, thus preventing high voltages from appearing across the motor 14.

SCR 86 is the load carrying SCR. When gate 82 is triggered, current flows from the battery via winding 97 of the autotransformer 98 to the motor 14 through switches 22 and 102. The start of the current flow induces a voltage in winding 108 of the autotransformer which charges up the capacitor 110 through intermediate parallel connected rectifier diodes 112 and 114. The capacitor holds its charge until a second SCR 116 is triggered. The second mentioned SCR serves to extinguish conduction of the first SCR 86. Accordingly, when SCR 116 is triggered, the voltage across SCR 86 is reversed and the SCR is turned off.

SCR 116 has its anode connected between capacitor 110 and the cathodes of diodes 112 and 114. The cathode of the SCR 116 is directly connected to the cathode of SCR 86. The gate terminal 119 of SCR 116 is connected to a triggering circuit connected by a voltage dropping resistor 118 connected to one end thereof to the cathode of SCR 86. The other end of the voltage dropping resistor is directly connected to a voltage divider comprising resistor 120 and capacitor 122. A Zener diode 124 is connected across the voltage divider 120, 122 for voltage regulation. The connection point 126 between resistor 120 and capacitor 122 is connected to the emitter 128 of unijunction transistor (UJT) 130. A biasing resistor 132 is connected between the voltage dropping resistor 118 and base two of UJT 130. During conduction of current through SCR 86, capacitor 122 becomes charged and triggers UJT 130 so as to cause current from the capacitor 122 to flow between the emitter-base one junction and then through the primary 134 of a transformer 136 the primary being connected between base-one and the negative terminal of battery 12. For each capacitor discharge, a pulse is transformed to the secondary winding 138 having resistor 140 connected thereacross. Leads 142 and 148 have first ends connected across the secondary winding 138 and are respectively connected at their opposite ends to the cathode and gate terminal 119 of SCR 116. Thus, upon transmission of a pulse to the gate terminal 119, SCR 116 is triggered causing the voltage across SCR 86 to be reversed which results in SCR 86 turning off.

In operation of the circuit, an accelerator pedal switch 22 is depressed. Switch 102 is normally closed and is only periodically opened when the vehicle maintains a steady speed. With the switches 22 and 102 closed, a conduction path is completed between SCR 86 and motor 14. Inasmuch as trigger circuit 117 causes periodic turning off of SCR 86, the output at the cathode of SCR 86 resembles a train of rectangular pulses having equal amplitude. The frequency of the pulses depends upon the setting of variable resistor 62 in the main trigger circuit of UJT 58. The setting, as mentioned, of variable resistor 62 depends upon the depression of the accelerator pedal.

When a desired speed is maintained for a period of time, switch 102 is periodically opened and closed so that the preselected vehicle speed can be maintained.

When one desires to slow down the vehicle, the accelerator pedal 22 is released. This ceases further energization of the motor 14. A brake pedal (not shown) is depressed thereby causing brake pedal rheostat 24 to adjust the field circuit of alternator 18. With the current flowing through the field winding 18b of the alternator, the normally free-wheeling alternator becomes connected in circuit and causes dynamic braking of the motor 14 and connected vehicle wheel 16. Also, due to the connection between the alternator and the battery 12, the alternator will cause charging of the battery.

It is presently contemplated that additional braking power, in the form of hydraulic means is to be included in the vehicle. Thus, the brake pedal can serve to adjust the brake pedal rheostat 24 until a certain point in brake pedal depression has been reached, at which time hydraulic brake means are called into play to further slow down the vehicle wheels.

The Leesona Zinc-Air Battery, produced by Compton Parkinson Ltd., is recommended for use in this system.

Most of the new battery systems that have been proposed, although offering significant advantages as regards energy density, have presented one or more of the following practical disadvantages: rare or inherently dangerous materials needed, operation at high temperatures, complicated by ancillary equipment, and only low rates of energy take-off permitted. The Leesona zinc-air system is virtually entirely free from these handicaps.

Unlike the conventional battery, in which the energy is stored and drawn as required from the active materials of the electrodes, the Leesona zinc-air battery draws its energy from the zinc within its cells and from the oxygen of the atmosphere: the cathodes are in fact energy conversion devices rather than energy stores, so this new battery is partly an energy storage device and partly a fuel cell. An outstanding characteristic of this zinc-air system is that it can be operated as a primary battery, that is, to be thrown away after use, or as a secondary or rechargeable battery. Furthermore, if it is used as a primary battery, it can be recharged mechanically simply by replacing the exhausted anodes by new ones. Its advantages are:

High energy densities—up to about 150Wh/lb as a primary, or 50 to 80Wh/lb as a secondary, depending on the application. It also offers comparable advantages in terms of volume-energy densities Readily available raw materials are used which do not present any special hazards Good discharge characteristics over a wide range of temperatures, and operation at ambient temperatures Minimum of ancillary equipment needed Costs are competitive A Leesona 12V, 100 Ah Zinc-air battery is about 1/5 the size and weight of a 100 Ah lead acid battery.

For electric traction a lead-acid battery weighing 1 lb would give approximately 12Wh of energy, whereas a zinc-air battery of similar weight would give between 60 and 80Wh. One of the drawbacks of battery electric cars has been their unduly restricted range of performance. The zinc-air battery, with far higher energy capabilities than the lead-acid type, should release the electric car from these limitations. On the basis of a 2000 lb car having batteries weighing 590 lb, the following performance characteristics have been quoted:

|  | lead-acid | zinc-air |
|---|---|---|
| Range in miles at steady 40 mph | 25 | 280 |
| Hours of operation in typical city driving | .95 | 10.4 |
| Maximum acceleration in mile/h per second from 0 to 30 mile/h (system operating at a 100% dissipation) | 1.7 | 5.5 |

It is estimated that the present system will operate at about 15% dissipation in which event the above figures would be multiplied by 8.5 times.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an electric vehicle having at least one driving motor, a control system for the motor comprising a source of DC voltage, means inverting the DC voltage to pulsating voltage for energizing the motor, switch means connecting the inverting means to the motor for energizing the motor, generator means physically connected to the motor, the generator means usually being in a no-load free-wheeling state, and braking means connecting the source and the input of the generator means for causing the energization thereof which results in the dynamic braking of the motor.

2. The structure of claim 1 wherein the output of the generator means is connected to the source for charging the source simultaneous with dynamic braking.

3. The structure of claim 1 wherein the braking means comprises adjustable resistance means in the field of the generator means.

4. The structure of claim 1 wherein the voltage inverting means comprises a Jones Chopper.

5. The structure of claim 1 wherein the motor comprises a DC series field type motor.

6. The structure of claim 1 together with means responsive to steady vehicle speed for periodically interrupting energization of the motor thereby maintaining the steady vehicle speed.

7. In a vehicle having at least one propelling wheel drivingly connected to an electric motor and a continuously driven generator, a source of electrical energy having power terminals directly connected to said generator, energy converting means connecting the source to the motor for intermittent energization of the motor, said generator being opeative to charge the source through said power terminals only in response to operation of the generator in a dynamic braking mode, and control means connected to the generator for no-load operation thereof while the motor is energized to prevent dynamic braking of the motor, said control means including field circuit resistor means substantially preventing any energy output from the generator and resistance varying means for reducing the resistance of said resistor means during the dynamic braking mode of operation to increase the energy output of the generator.

* * * * *